US010366271B2

(12) United States Patent
Ahn et al.

(10) Patent No.: US 10,366,271 B2
(45) Date of Patent: Jul. 30, 2019

(54) METHOD AND APPARATUS FOR AUTHENTICATING FINGERPRINTS USING REFLECTED WAVE

(71) Applicant: SHIN SUNG C&T CO., LTD., Geumcheon-gu, Seoul (KR)

(72) Inventors: Jae Hyun Ahn, Seoul (KR); Ci Moo Song, Yongin-si (KR); Keun Jung Youn, Incheon (KR); Yong Kook Kim, Seoul (KR)

(73) Assignee: SHIN SUNG C&T CO., LTD., Seoul (KR)

( * ) Notice: Subject to any disclaimer, the term of this patent is extended or adjusted under 35 U.S.C. 154(b) by 29 days.

(21) Appl. No.: 15/862,230

(22) Filed: Jan. 4, 2018

(65) Prior Publication Data

US 2018/0196984 A1 Jul. 12, 2018

(30) Foreign Application Priority Data

Jan. 6, 2017 (KR) .................... 10-2017-0002125

(51) Int. Cl.
*G06K 9/00* (2006.01)
*G05B 19/00* (2006.01)
(Continued)

(52) U.S. Cl.
CPC .......... *G06K 9/0002* (2013.01); *G06F 21/32* (2013.01); *G06K 9/00087* (2013.01); *G06K 9/00899* (2013.01); *G06K 9/62* (2013.01)

(58) Field of Classification Search
CPC .............................. G06K 9/00; G06K 9/00906
USPC ...... 382/100, 103, 106, 108, 115, 116, 124, 382/128, 162, 168, 172, 173, 181, 199, 382/219, 220, 224, 232, 254, 274, 276,
(Continued)

(56) References Cited

U.S. PATENT DOCUMENTS

| 5,563,345 | A | * | 10/1996 | Kersten | A61B 5/1172 382/124 |
| 7,907,754 | B2 | * | 3/2011 | Niinuma | G06K 9/00906 340/5.82 |
| 2014/0354596 | A1 | * | 12/2014 | Djordjev | G06K 9/0002 345/175 |
| 2016/0217314 | A1 | * | 7/2016 | Kim | G06K 9/00087 |
| 2016/0313439 | A1 | * | 10/2016 | Min | G01S 7/539 |

FOREIGN PATENT DOCUMENTS

JP 2007-244712 A 9/2007
KR 10-2016-0092755 A 8/2016

OTHER PUBLICATIONS

Office Action issued by the Korean Intellectual Property Office for corresponding Korean Patent Application No. 10-2017-0002125, dated Jul. 5, 2017.

* cited by examiner

*Primary Examiner* — Seyed H Azarian
(74) *Attorney, Agent, or Firm* — Myers Wolin, LLC.

(57) ABSTRACT

Fingerprint sensing technology of a fingerprint sensor for authenticating whether a fingerprint of a subject is forged or falsified by using a waveform reflected from the subject, such as an ultrasonic wave. The fingerprint authentication apparatus includes a fingerprint sensor configured to apply a wave signal to a subject and receive a wave signal reflected from the subject, a local waveform detector configured to detect local waveforms by dividing the received wave signal by a reception time, and a forgery detection unit configured to count the number of local waveforms and detect whether a fingerprint provided from the subject is forged or not based on the counted number of local waveforms.

8 Claims, 7 Drawing Sheets

(51) Int. Cl.
*G06K 9/62* (2006.01)
*G06F 21/32* (2013.01)
(58) Field of Classification Search
USPC ................ 382/285–291, 312, 321; 340/5.82; 345/175
See application file for complete search history.

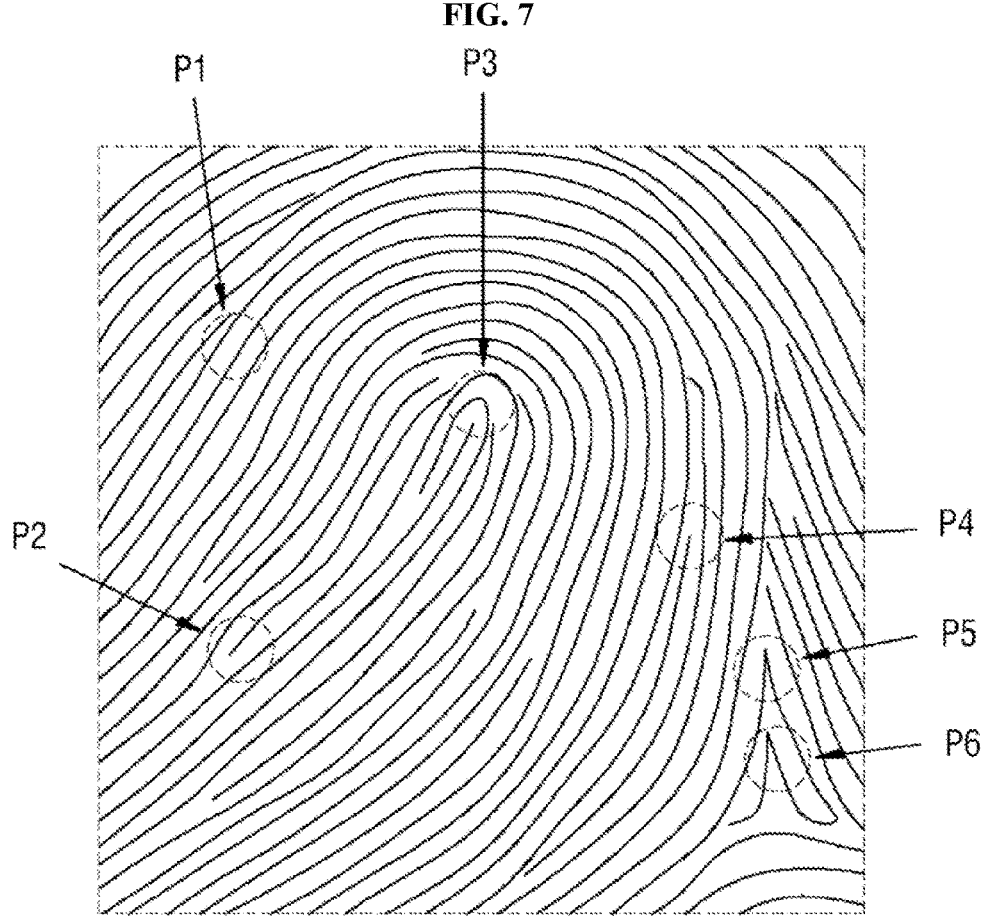

METHOD AND APPARATUS FOR AUTHENTICATING FINGERPRINTS USING REFLECTED WAVE

CROSS-REFERENCE TO RELATED APPLICATION

This application claims priority from Korean Patent Application No. 10-2017-0002125 filed on Jan. 6, 2017 in the Korean Intellectual Property Office, and all the benefits accruing therefrom under 35 U.S.C. 119, the contents of which in its entirety are herein incorporated by reference.

BACKGROUND

1. Technical Field

The present disclosure relates to fingerprint sensing technology of a fingerprint sensor to be used, and more particularly to a method and an apparatus for authenticating whether a fingerprint of a subject is forged or falsified by using a waveform reflected from the subject, such as a wave signal.

2. Description of the Related Art

Currently, various means are used to confirm an identity of an individual in a wide range of fields including portable devices such as smart phones and laptops, access management systems in buildings, and financial transaction systems. Such an identity verification means is required to ensure security from a third party's infringement in addition to promptness and convenience of use.

In a conventional security system, an authentication method for recognizing biometric characteristics of an individual and comparing the biometric characteristics with data stored in advance is mainly used. The most commonly used authentication method using an individual's biometric characteristics is a personal authentication method using a fingerprint sensor. The fingerprint sensor has various advantages such as ease of use, accuracy, low cost and the like, compared to a password input or other complicated biometrics technologies.

As is known, identity recognition technology using a fingerprint sensor includes a fingerprint input device and a signal processing algorithm. General fingerprint sensor technology includes the steps of emitting light or sound waves, recognizing the shape of the surface of a subject having ridges and valleys, and comparing it with the previously stored biometric data to authenticate whether the subject is the same person.

However, as the usability and popularity of the fingerprint increase, the personal information is frequently stored or verified through the fingerprint authentication. Thus, if the fingerprint is forged or falsified and the authentication system is disabled, the damage may be extensive.

Therefore, apart from an algorithm for performing comparison to determine whether an image of the recognized fingerprint belongs to a specific person, there is a need for a technique for separately determining and authenticating whether the fingerprint is forged or falsified. In particular, this authentication technique should be able to improve the accuracy of forgery/falsification determination without causing excessive algorithm complexity or user inconvenience.

PRIOR ART DOCUMENT

Patent Document

U.S. Patent Application Publication No. 2016-0224823 (2016 Aug. 4)

SUMMARY

Aspects of the present disclosure provide a method and apparatus for authenticating whether or not an input fingerprint is forged or falsified prior to the determination of an identity through fingerprint recognition.

Aspects of the present disclosure also provide a method and apparatus for promptly authenticating whether an input fingerprint is forged or falsified at a low cost based on the fact that a forged or falsified fingerprint differs from a fingerprint of a living body.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a fingerprint authentication apparatus comprising: a fingerprint sensor configured to apply a wave signal to a subject and receive a wave signal reflected from the subject; a local waveform detector configured to detect local waveforms by dividing the received wave signal by a reception time; and a forgery detection unit configured to count the number of local waveforms and detect whether a fingerprint provided from the subject is forged or not based on the counted number of local waveforms.

The forgery detection unit detects whether the fingerprint provided from the subject is forged or not based on whether a ratio of an amplitude of a local waveform reflected from a forged fingerprint film and an amplitude of a local waveform reflected between the forged fingerprint film and a finger to which the forged fingerprint film is attached, among the detected local waveforms, exceeds a predetermined threshold value.

In another embodiment, the forgery detection unit detects whether the fingerprint provided from the subject is forged or not by further performing a process of comparing a position of a first local waveform reflected from an inside of the subject with a position of a second local waveform reflected from an inside of a normal finger, among the detected local waveforms. Particularly, the forgery detection unit detects whether the fingerprint provided from the subject is forged or not based on whether a ratio of an interval between the first local waveform and a third local waveform reflected from a surface of the subject and an interval between the second local waveform and a fourth local waveform reflected from a surface of the normal finger, among the detected local waveforms, exceeds a predetermined threshold value.

Further, the forgery detection unit may detect whether the fingerprint provided from the subject is forged or not based on whether a ratio between an amplitude of the third local waveform and an amplitude of the fourth local waveform exceeds a predetermined threshold value.

According to the present disclosure, it is possible to promptly authenticate whether an input fingerprint is forged or falsified by using already provided elements of a fingerprint sensor using reflected waves.

Further, according to the present disclosure, there is an advantage that various fingerprint forgery/falsification schemes such as faking a fingerprint with a material different from a human body or applying a film to a finger can be verified in a general way.

BRIEF DESCRIPTION OF THE DRAWINGS

The above and other aspects and features of the present disclosure will become more apparent by describing in detail exemplary embodiments thereof with reference to the attached drawings, in which:

FIG. 7 exemplarily shows a fingerprint of the subject and singular points included in the fingerprint.

DETAILED DESCRIPTION OF THE EMBODIMENTS

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like numbers refer to like elements throughout. Hereinafter, embodiments of the present disclosure will be described in detail with reference to the accompanying drawings.

Figure 1:
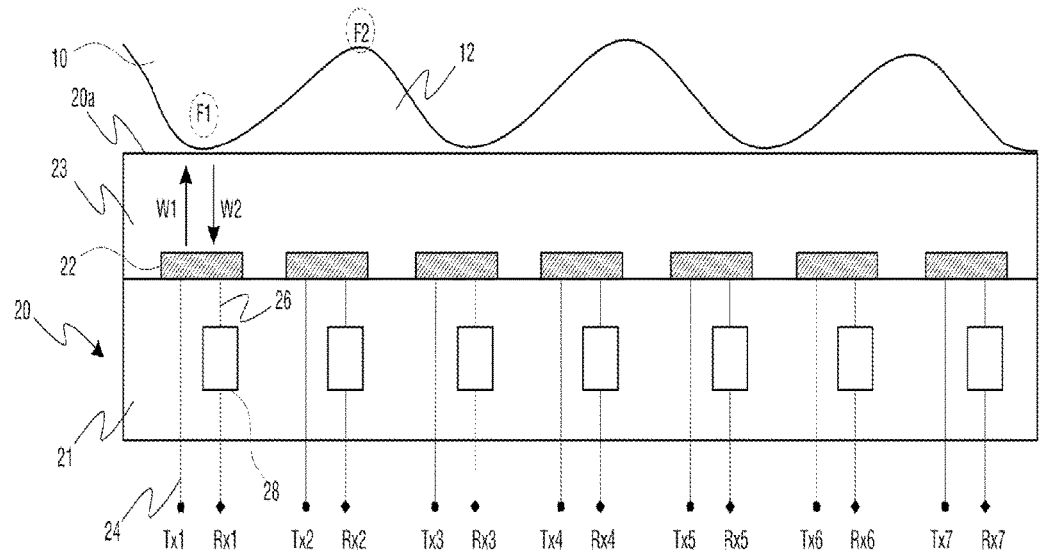
FIG. 1 is a diagram schematically showing a fingerprint sensor according to an embodiment of the present disclosure.

FIG. 1 is a diagram schematically showing a fingerprint sensor 20 according to an embodiment of the present disclosure.

Referring to FIG. 1, the fingerprint sensor 20 may include at least one signal transmitting/receiving unit 22 for applying a wave signal W1 to a subject 10 to be inspected, and a signal applying electrode 24 electrically connected to each signal transmitting/receiving unit 22. The wave signal W1 applied to the subject 10 may be reflected from the surface of the subject 10 or from the inside thereof and a reflected wave signal W2 reflected from the subject 10 may be received again by the signal transmitting/receiving unit 22 and transmitted via a signal receiving electrode 26. The reflected wave signal W2 reflected from the subject 10 may be received by the signal transmitting/receiving unit 22 and transmitted to a signal controller 130 of FIG. 6, which will be described later, through the signal receiving electrode 26 and may pass through a signal amplifier or transistor 28 of FIG. 1, which will be described later, in the process.

In the present disclosure, the subject 10 may be a partial region of a human body, for example, a fingerprint region of a finger tip. The subject 10 may include a ridge region F1, which is a relatively protruding skin region compared to other surrounding skin regions, and a valley region F2, which is a region between the ridge regions F1. When the ridge region F1 of the subject 10 is in contact with a surface 20a of the fingerprint sensor 20 corresponding to the signal transmitting/receiving unit 22 of the fingerprint sensor 20, the valley region F2 may be spaced apart from the fingerprint sensor 20 without being in direct contact with the surface 20a of the fingerprint sensor 20. A space 12 between the valley region F2 and the fingerprint sensor 20 in a state where the ridge region F1 is in contact with the surface 20a of the fingerprint sensor 20 may be an empty space (air gap) or a space including sweat or foreign matter discharged from the subject 10.

The signal applying electrode 24 and the signal receiving electrode 26 of the fingerprint sensor 20 according to the present disclosure may be formed of a conductive material such as metal, an alloy, conductive metal oxide, conductive metal nitride, or a conductive polymer. The signal applying electrode 24, the signal receiving electrode 26, and the signal amplifier 28 may be included in an insulating layer 21. The insulating layer 21 may be formed of silicon oxide, silicon nitride, an insulating polymer, or the like. The signal transmitting/receiving unit 22 may be a conductive material layer formed of a conductive material such as metal, an alloy, conductive metal oxide, conductive metal nitride, piezo-ceramic silicon, or a conductive polymer. Further, a passivation layer 23 may be additionally formed on the insulating layer 21 and the signal transmitting/receiving unit 22. The passivation layer 23 may be formed of an organic material, a polymer, silicon oxide, silicon nitride, or the like The signal transmitting/receiving unit 22 may form the surface 20a of the fingerprint sensor 20 and may be exposed to the outside of the fingerprint sensor 20 and brought into contact with the subject 10. In the present disclosure, the fingerprint sensor 20 may include at least one signal transmitting/receiving unit 22, and the width of or the interval between the signal transmitting/receiving units 22 may be smaller than the width or the interval of the ridge regions F1 or the valley regions F2 of the subject 10. For example, the width or the interval between the signal transmitting/receiving units 22 is about several micrometers to several hundreds of micrometers. As shown in FIG. 1, terminals Tx1 to Tx7 of the signal applying electrode 24 and terminals Rx1 to Rx7 of the signal receiving electrode 26 may be connected to a signal controller 130 of FIG. 6, which will be described later.

As described above, after imaging the ridges and valleys of the subject 10, by comparing the obtained data with the data stored in advance, it is possible to determine whether the subject is identical. However, even if two fingerprint data to be compared are determined to be the same or similar, the identity of the subject 10 is not completely confirmed. For example, in a case where the fingerprint shape of the subject 10 is faked by forgery or falsification, the authentication system may be disabled only with the identity of the fingerprint shape. Therefore, in the present disclosure, prior to the determination of the identity, the authenticity of the input fingerprint is first verified to improve the reliability of the fingerprint authentication system.

As a method of forging and falsifying a fingerprint, there is a case where a forged fingerprint made of a film is overlaid on the finger of another person or a case where a fingerprint of a human body is faked with a separate material as in a mannequin's finger. Hereinafter, solutions for the former case and the latter case will be described as a first embodiment and a second embodiment, respectively.

Figure 2:
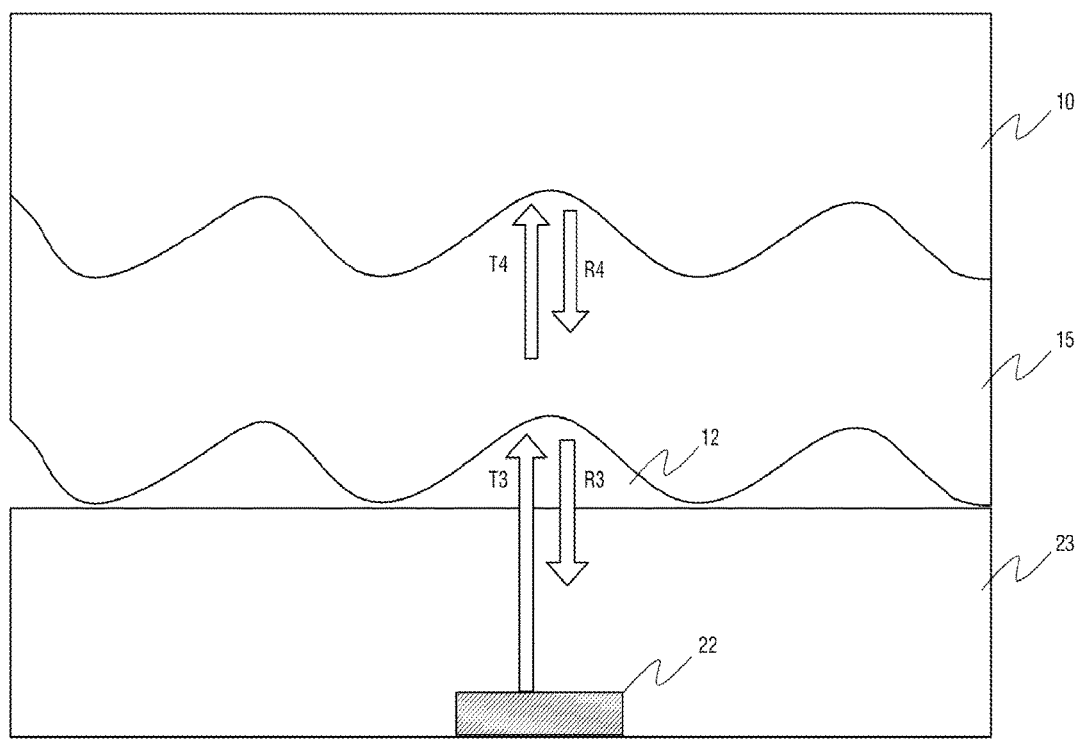
FIG. 2 is a diagram showing a case where a forged fingerprint film is attached to a fingertip of a subject according to a first embodiment of the present disclosure.

FIG. 2 is a diagram showing a case where a forged fingerprint film 15 is attached to the fingertip of the subject 10 according to the first embodiment of the present disclosure. A wave signal T3 generated by the signal transmitting/receiving unit 22 is partially reflected by the forged fingerprint film 15 (R3), and a wave signal T4 having passed through the forged fingerprint film 15 is again partially reflected from the surface of an actual finger (R4). Here, the signal generated in the signal transmitting/receiving unit 22 is actually partially reflected also from the passivation layer 23 and the air gap 12, but the signal (not shown) reflected from this portion was constant without being related to the fingerprint to be tested, and thus, it was omitted.

Figure 3:
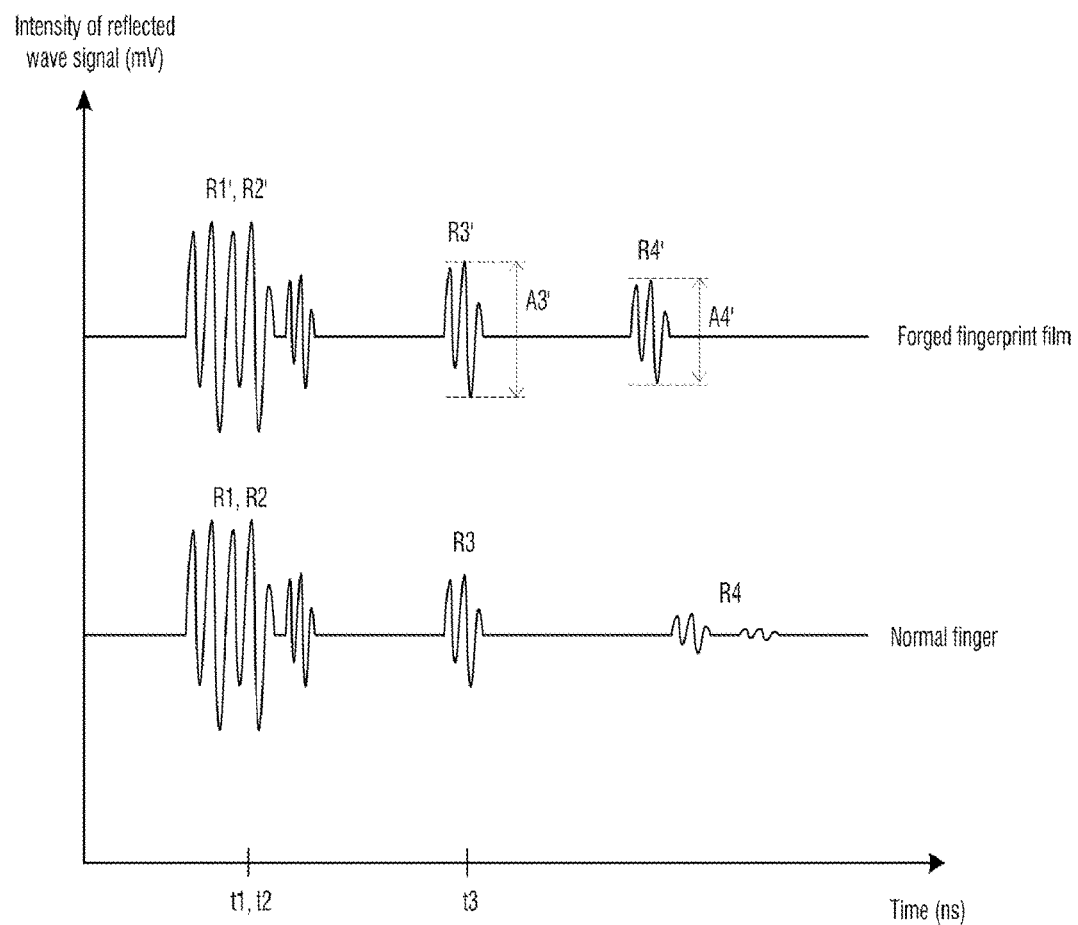
FIG. 3 is a diagram showing time-dependent local waveforms included in a wave signal received by a signal transmitting/receiving unit according to the first embodiment.

FIG. 3 is a diagram showing time-dependent local waveforms included in a wave signal received by the signal transmitting/receiving unit 22 according to the first embodiment. First, if the input fingerprint is provided from a normal finger, the local waveforms R1 and R2 reflected from the passivation layer 23 and the air gap 12 and the local waveform R3 reflected from the finger are clearly detected. Of course, the local waveform R4 reflected by the blood vessels and the bone tissue inside the finger may also be detected minutely, but is relatively small compared to the local waveform R3 reflected from the finger.

On the other hand, if the input fingerprint is provided by the forged fingerprint film 15 attached to the fingertip, since the forged fingerprint film 15 and the finger 10 have different acoustic impedances, a clear local waveform R4' may be measured at the boundary point. Of course, also in this case, the local waveforms R1' and R2' reflected from the passivation layer 23 and the air gap 12 have the same amplitudes and time periods t1 and t2 as the reflected local waveforms R1 and R2. The local waveform R3 reflected from the normal finger and the local waveform R3' reflected by the forged fingerprint film 15 may be displayed in the same time period t3 even if the amplitudes thereof are slightly different from each other.

Based on the above results, since the local waveform R4 reflected from the inside of the normal finger is smaller than the local waveform R4' reflected between the forged fingerprint film 15 and the finger 10, it is possible to determine whether or not the forged fingerprint film 15 is attached to the finger by measuring the amplitude A4' of the local waveform R4' reflected between the forged fingerprint film 15 and the finger 10. Specifically, if the measured amplitude A4' exceeds a predetermined threshold value, it is determined that the finger is not a normal finger, and otherwise, it is determined that the finger is a normal finger. Afterwards, a process of checking the identity by the fingerprint sensor is performed only when it is determined that the finger is a normal finger.

The threshold value may be empirically obtained at a level distinguishable from the normal finger. However, a ratio A4'/A3' of the amplitude A4' of the local waveform R4' to the amplitude A3' of the local waveform R3' reflected by the forged fingerprint film 15 may be used as a reference value. For example, if the ratio is 0.7 or more, it may be determined as a forged fingerprint film.

Figure 4:
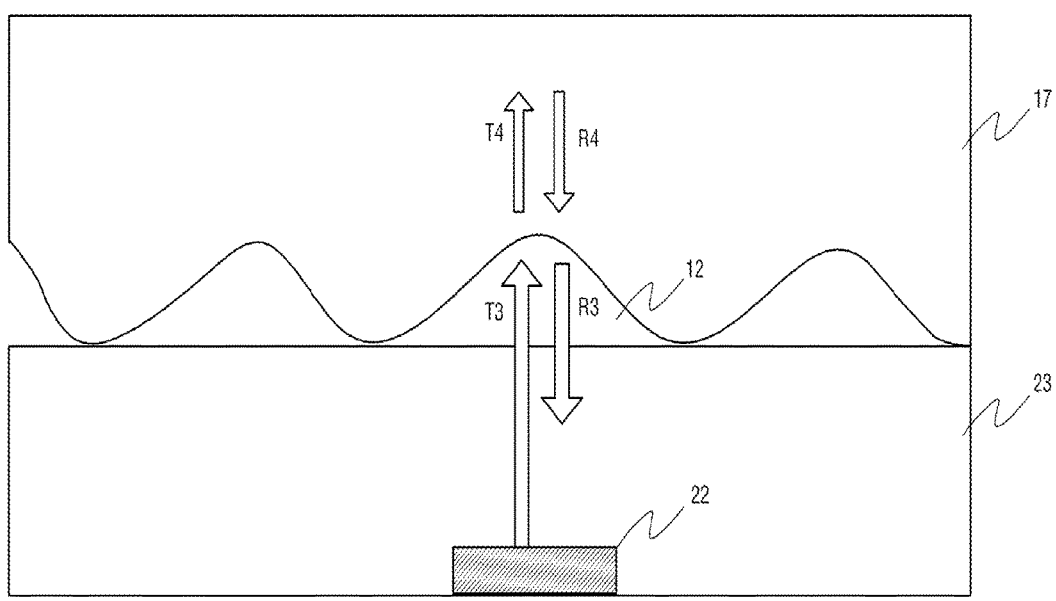
FIG. 4 is a diagram showing a case where a subject is faked with a specific material according to a second embodiment of the present disclosure.

FIG. 4 is a diagram showing a case where the subject 10 is faked with a specific material according to the second embodiment of the present disclosure. The signal T3 generated by the signal transmitting/receiving unit 22 may be partially reflected by a faked finger 17 (R3), and the signal T4 having passed through the faked finger 17 may be partially reflected at any point inside the fake finger 17 (R4'). Here, the signal generated in the signal transmitting/receiving unit 22 is actually partially reflected also from the passivation layer 23 and the air gap 12, but the signal (not shown) reflected from this portion was constant without being related to the fingerprint to be tested, and thus, it was omitted.

Figure 5:
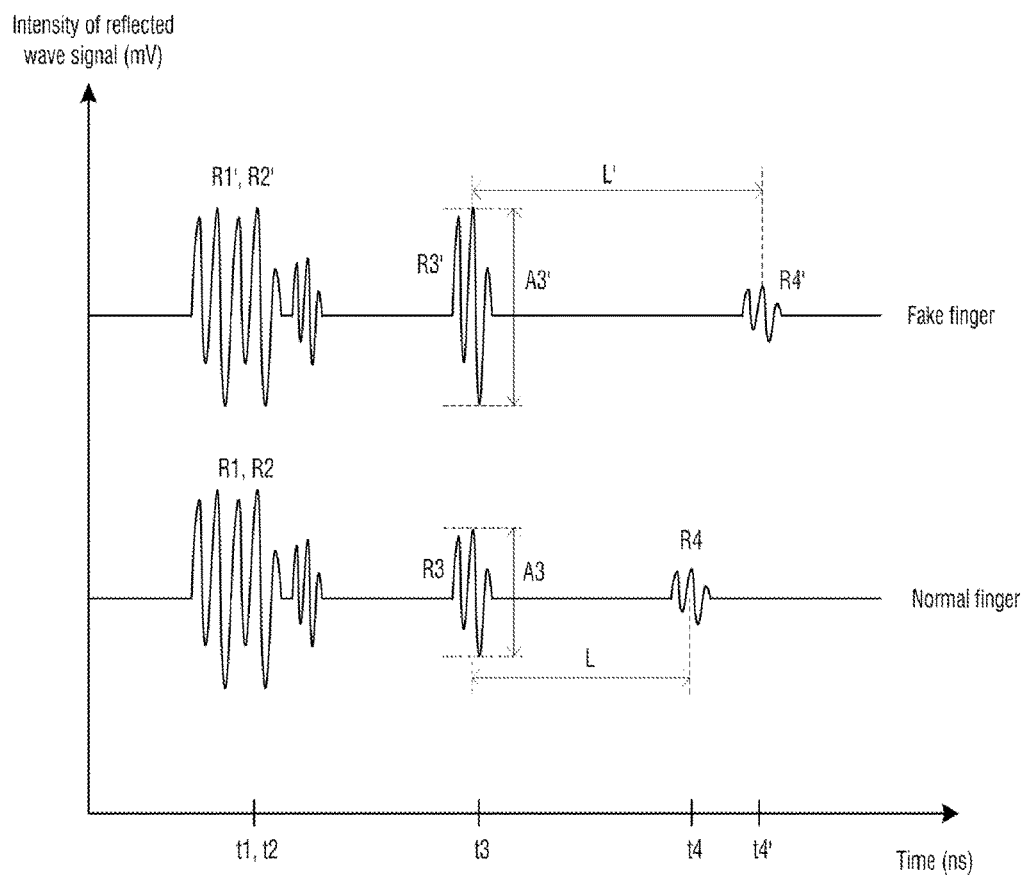
FIG. 5 is a diagram showing time-dependent local waveforms included in a wave signal received by the signal transmitting/receiving unit according to the second embodiment.

FIG. 5 is a diagram showing time-dependent local waveforms included in a wave signal received by the signal transmitting/receiving unit 22 according to the second embodiment. Regardless of whether the input fingerprint is provided from the normal finger or from the faked finger 17, the relatively small local waveforms R4 and R4' reflected from each of them may be detected by the signal transmitting/receiving unit 22. However, since the local waveform R4 reflected from the inside of the normal finger and the local waveform R4' reflected from the inside of the faked finger are different in the acoustic impedance and the position of reflection, they are measured in time periods t4 and t4' that are separated from each other. That is, the time interval L between the local waveform R3 and the local waveform R4 differs from the time interval L' between the local waveform R3' and the local waveform R4'. Thus, it may be determined whether or not the finger is a faked finger based on whether the ratio of two time intervals exceeds a predetermined first threshold value.

Meanwhile, since the faked finger and the normal finger are made of different materials, not only the acoustic impedance between them but also the magnitude of the signal reflected from the surface may be different. Therefore, for more accurate determination, the ratio A3'/A3 of the amplitudes of the local waveforms R3 and R3' reflected from the surface of each finger in addition to the ratio of the above-mentioned time intervals may be further considered. Here, if the ratio A3'/A3 of the amplitudes exceeds a predetermined second threshold, it is determined that the finger is a faked finger. Afterwards, a process of checking the identity by the fingerprint sensor is performed only when it is determined that the finger is a normal finger.

Although the first and second embodiments described above may be selectively and independently implemented, they may also be implemented together in one apparatus in order to increase the versatility.

Figure 6:
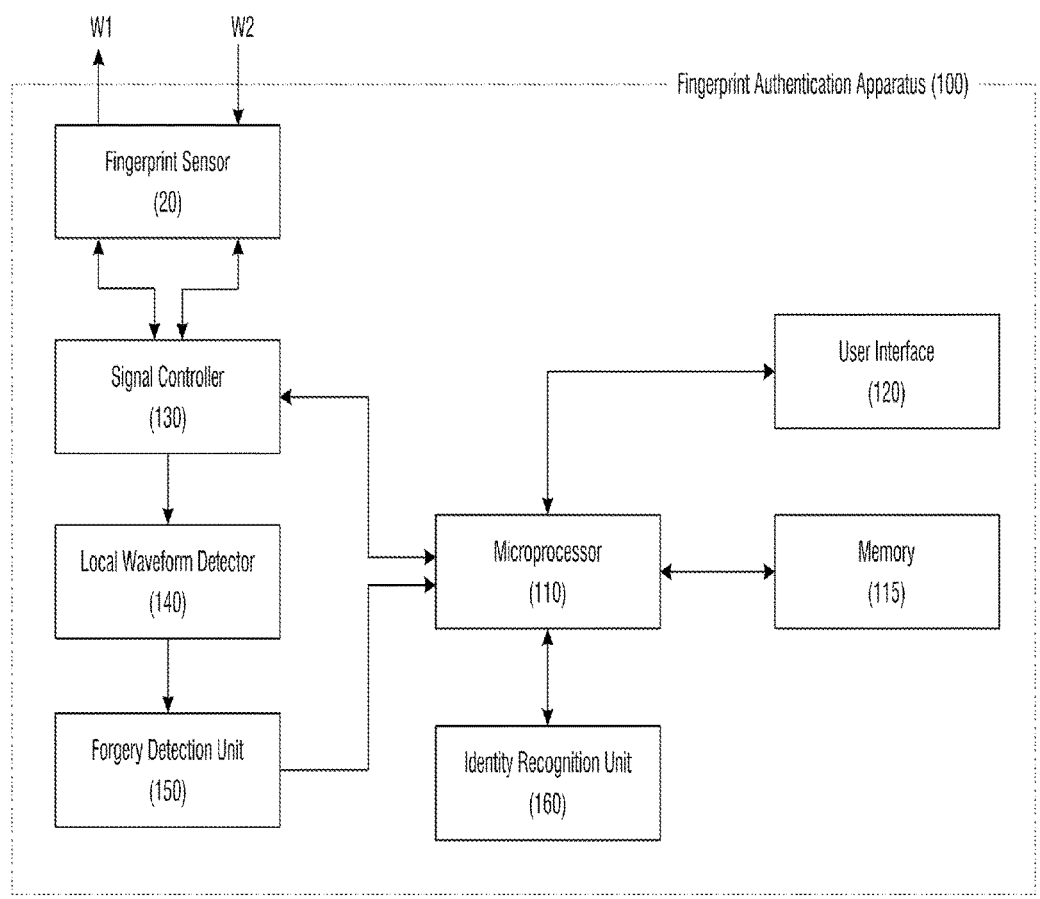
FIG. 6 is a block diagram showing a configuration of a fingerprint authentication apparatus according to an embodiment of the present disclosure.

FIG. 6 is a block diagram showing a configuration of a fingerprint authentication apparatus 100 according to an embodiment of the present disclosure. The fingerprint authentication apparatus 100 may be configured to include a fingerprint sensor 20, a microprocessor 110, a memory 115, a user interface 120, a signal controller 130, a local waveform detector 140, a forgery detection unit 150 and an identity recognition unit 160.

The microprocessor or CPU 110 optionally includes a cache memory, which is a local storage for temporarily storing instructions, data or computer addresses. The microprocessor 110 executes instructions (or software modules) recorded on a computer-readable storage medium, such as the memory 115. For example, the forgery detection unit 150 or the identity recognition unit 160 may be created as a software module, loaded into the memory 115 by the microprocessor 110, and executed by the microprocessor 110. In addition, the microprocessor 110 controls the overall operation of other components included in the fingerprint authentication apparatus 100.

The memory 115 may include a random access memory (RAM), a read-only component (ROM), and/or a combination thereof and may load the software modules or basic routines necessary for booting. Further, the memory 115 may store a reference data database (DB) for fingerprint comparison and may further include a hard disk drive, an optical disk drive, a solid-state memory device (SSD) and the like for recording the processed result in the fingerprint authentication apparatus 100.

The user may input commands and/or information to the fingerprint authentication apparatus 100 through the user interface 120. Examples of the user interface 120 may include an input means such as a keyboard, a mouse, a touch pad, a joystick, a game pad and a microphone, and a video/audio output means such as a display panel and a speaker.

As described above with reference to FIG. 1, the fingerprint sensor 20 applies the wave signal W1 to the subject 10 and receives the wave signal W2 reflected from the subject. The wave signal may include a sound wave, an ultrasonic wave, and a radio frequency (RF). At this time, the signal controller 130 triggers the application of the applied wave signal W1 and controls to receive the reflected wave signal W2 synchronously.

The local waveform detector 140 detects the local waveform by dividing the received wave signal by the reception time. For example, the local waveform is a signal classified by the time period, remaining after filtering a signal (noise signal) below a certain level.

On the other hand, according to the first embodiment, the forgery detection unit 150 counts the number of local waveforms and detects whether a fingerprint provided from the subject is forged or not based on the counted number of local waveforms. Specifically, the forgery detection unit 150 detects whether the fingerprint provided from the subject is forged or not based on whether a ratio of the amplitude A3' (see FIG. 3) of the local waveform R3' (see FIG. 3) reflected from the forged fingerprint film and the amplitude A4' (see FIG. 3) of the local waveform R4' (see FIG. 3) reflected between the forged fingerprint film and the finger to which the forged fingerprint film is attached, among the detected local waveforms, exceeds a predetermined threshold value. For example, when the ratio of A4' to A3' exceeds 0.7, it may be determined that forgery has been performed.

Meanwhile, the forgery detection unit 150 may add the criteria according to the second embodiment to the criteria according to the first embodiment. Accordingly, the forgery detection unit 150 detects whether the fingerprint provided from the subject is forged or not by further performing a process of comparing the position t4' (see FIG. 5) of the first local waveform R4' (see FIG. 5) reflected from the inside of the subject with the position t4 (see FIG. 5) of the second local waveform R4 (see FIG. 5) reflected from the inside of the normal finger, among the detected local waveforms.

In particular, the forgery detection unit 150 may detect whether the fingerprint provided from the subject is forged or not based on whether a ratio of the interval L' (see FIG. 5) between the first local waveform R4' (see FIG. 5) and the third local waveform R3' reflected from the surface of the subject and the interval L between the second local waveform R4 (see FIG. 5) and the fourth local waveform R3 (see FIG. 5) reflected from the surface of the normal finger, among the detected local waveforms, exceeds a predetermined threshold value.

Meanwhile, in addition to the positional analysis of the local waveform in order to further increase the accuracy, the forgery detection unit 150 may detect whether the fingerprint provided from the subject is forged or not based on whether a ratio between the amplitude A3' (see FIG. 5) of the third local waveform R3' (see FIG. 5) and the amplitude A3 (see FIG. 5) of the fourth local waveform R3 (see FIG. 5) exceeds a predetermined threshold value.

Referring again to FIG. 6, the identity recognition unit 160 recognizes the identity of the subject through analysis of the fingerprint provided from the subject only when the forgery detection unit 150 determines that the fingerprint provided from the subject has not been forged. At this time, preferably, the identity recognition unit 160 recognizes the identity of the subject using intactly the local waveforms detected by the local waveform detector 140 in terms of using already obtained information. However, the present disclosure is not limited thereto, and the identity of the fingerprint may be recognized by a separate means regardless of the forgery detection process.

Specifically, the identity recognition unit 160 may perform pattern processing using the fingerprint information of the subject 10, convert the singular points of the fingerprint of the subject 10 into data, and then perform a process of comparison with fingerprint DB (reference data DB) of the subject 10 previously stored in the memory 115.

First, the pattern processing includes smoothing, binarization and thinning. The smoothing may be performed by filtering to remove noise from the reflected wave signal W2. The binarization is a process for distinguishing between the ridge region F1 of the fingerprint area of the subject 10 and the valley region F2 between the ridge regions F1 in black and white. The thinning means that the line width represented by the ridge region F1 or the valley region F2 of the fingerprint area of the subject 10 is reduced to one pixel.

Then, the singular points appearing in the fingerprint of the subject 10 are converted into data. Referring to FIG. 7 exemplarily showing the fingerprint of the subject and the singular points included in the fingerprint, various types of singular points may be included in the fingerprint of the subject 10. For example, P1, P2, P3, P4, P5 and P6 may be referred to as singular points. In the fingerprint shape of the subject 10, a ridge, a valley, an ending point, a bifurcation, an upper core, a lower core, right delta and the like may be determined as singular points.

Finally, the identity recognition unit 160 may compare the fingerprint data stored in the fingerprint DB with the fingerprint data of the measured subject 10, and confirm that the stored subject and the measured subject 10 are the same person when two fingerprint data are determined to be the same.

The result detected by the forgery detection unit 150 and the result recognized by the identity recognition unit 160 may be stored again in the memory 115 and utilized in various applications using fingerprint authentication and identity recognition.

Each of the components shown in FIG. 6 may be implemented in software, such as a task, a class, a subroutine, a process, an object, an execution thread and a program executed in a predetermined area on a memory, or hardware such as a field-programmable gate array (FPGA) or an application-specific integrated circuit (ASIC), and may also be a combination of software and hardware. The components may be included in a computer-readable storage medium, or some of the components may be distributed to a plurality of computers.

Further, each block may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

In concluding the detailed description, those skilled in the art will appreciate that many variations and modifications can be made to the preferred embodiments without substantially departing from the principles of the present disclosure. Therefore, the disclosed preferred embodiments of the invention are used in a generic and descriptive sense only and not for purposes of limitation.

What is claimed is:

1. A fingerprint authentication apparatus comprising:
   a fingerprint sensor configured to apply a wave signal to a subject and receive a wave signal reflected from the subject;
   a local waveform detector configured to detect local waveforms by dividing the received wave signal by a reception time; and
   a forgery detection unit configured to count the number of local waveforms and detect whether a fingerprint provided from the subject is forged or not based on the counted number of local waveforms,
   wherein the wave signal is an ultrasonic signal, and
   wherein the forgery detection unit detects whether the fingerprint provided from the subject is forged or not based on whether a ratio of an amplitude of a local waveform reflected from a forged fingerprint film and an amplitude of a local waveform reflected between the forged fingerprint film and a finger to which the forged fingerprint film is attached, among the detected local waveforms, exceeds a predetermined threshold value.

2. The fingerprint authentication apparatus of claim 1, wherein the forgery detection unit detects whether the fingerprint provided from the subject is forged or not by further performing a process of comparing a position of a first local waveform reflected from an inside of the subject with a position of a second local waveform reflected from an inside of a normal finger, among the detected local waveforms.

3. The fingerprint authentication apparatus of claim 1, wherein the forgery detection unit determines that the subject is a normal finger only when both of the detection process based on the counted number of waveforms and the detection process of comparing the positions of the first and second local waveforms have been passed.

4. The fingerprint authentication apparatus of claim 3, wherein the forgery detection unit detects whether the fingerprint provided from the subject is forged or not based on whether a ratio of an interval between the first local waveform and a third local waveform reflected from a surface of the subject and an interval between the second local waveform and a fourth local waveform reflected from a surface of the normal finger, among the detected local waveforms, exceeds a predetermined threshold value.

5. The fingerprint authentication apparatus of claim 4, wherein the forgery detection unit detects whether the fingerprint provided from the subject is forged or not based on whether a ratio between an amplitude of the third local waveform and an amplitude of the fourth local waveform exceeds a predetermined threshold value.

6. The fingerprint authentication apparatus of claim 1, further comprising an identity recognition unit configured to recognize an identity of the subject through analysis of the fingerprint provided from the subject only when the forgery detection unit determines that the fingerprint provided from the subject has not been forged.

7. The fingerprint authentication apparatus of claim 1, wherein the identity recognition unit recognizes an identity of the subject using intactly the local waveforms detected by the local waveform detector.

8. The fingerprint authentication apparatus of claim 1, further comprising a signal amplifier configured to amplify the received wave signal.

* * * * *